United States Patent [19]

Kulas

[11] 3,737,642

[45] June 5, 1973

[54] FUNCTION GENERATING USING PIECEWISE LINEAR APPROXIMATION

[75] Inventor: William C. Kulas, Hanover, Mass.

[73] Assignee: Krohn-Hite Corporation, Cambridge, Mass.

[22] Filed: Aug. 9, 1971

[21] Appl. No.: 169,946

[52] U.S. Cl. ......................235/197, 307/229, 328/21

[51] Int. Cl. ......................G06g 7/28

[58] Field of Search ......................235/197; 328/142, 328/21; 307/229, 230, 317

[56] References Cited

UNITED STATES PATENTS

| | | | |
|---|---|---|---|
| 3,191,017 | 6/1965 | Miura et al. | 235/197 X |
| 3,506,810 | 4/1970 | Katell | 235/197 X |
| 3,560,726 | 2/1971 | Platt | 235/197 |
| 3,523,195 | 8/1970 | Thomas et al. | 235/197 X |
| 3,443,082 | 5/1969 | Abe | 235/197 |
| 3,584,210 | 6/1971 | Udall | 235/197 |

*Primary Examiner*—Joseph F. Ruggiero
*Attorney*—Charles Hieken

[57] ABSTRACT

Resistor-diode circuitry approximates converting linear function to a sinusoidal function by piecewise linear segments through progressive clamping with increasing breakpoint level while using a single potential source for each polarity provided by an emitter follower that is arranged to compensate for the diode voltage drop.

6 Claims, 4 Drawing Figures

FUNCTION GENERATING USING PIECEWISE LINEAR APPROXIMATION

BACKGROUND OF THE INVENTION

The present invention relates in general to function generating and more particularly concerns novel apparatus and techniques for converting one waveform to another reliably and relatively economically. A commercial embodiment of the invention converts a triangular waveform to a sine wave.

A typical function generator provides waveforms that are sine, square, triangle, positive ramp and negative ramp of variable frequencies. Typically, the base waveform is a square wave that is integrated to provide a triangular waveform. The triangular waveform is then typically processed by a sine shaper circuit incorporating resistors and diodes to shape the triangular waveform into a sine wave. Typical prior art approaches involve arranging the diodes to progressively conduct at different breakpoints with a different discrete voltage provided for each breakpoint. This approach presents practical difficulties in accurately providing all the different discrete voltage levels.

Accordingly, it is an important object of this invention to provide an improved function generator.

It is another object of the invention to provide a function generator in accordance with the preceding object that incorporates improved piecewise linear approximation of a predetermined functional relationship with diodes and resistors.

It is a further object of the invention to achieve one or more of the preceding objects with circuitry that may provide virtually any number of linear segments with but a single voltage source.

It is a further object of the invention to achieve one or more of the preceding objects whereby both polarities of a desired functional relationship may be established with but two voltage sources.

It is a more specific object of the invention to achieve one or more of the preceding objects while shaping a triangular waveform into a sine wave.

SUMMARY OF THE INVENTION

According to the invention, function generating circuitry comprises an input and an output with a plurality of resistances in parallel direct coupling the input to the output. There is a source of at least a first fixed potential and a unilaterally conducting device connected between the potential source and the end of an associated resistance all poled in the same sense. For providing symmetrical waveforms, preferably there are pairs of resistances in parallel and first and second potential sources of opposite polarity. There are a corresponding number of pairs of unilaterally conducting devices connected in series between the potential sources with the junction of each diode pair connected to the junction of an associated resistor pair. Preferably, the sources of the potentials comprise emitter followers that compensate for the potential drop across the diodes.

Numerous other features, objects and advantages of the invention will become apparent from the following specification when read in connection with the accompanying drawing in which:

DETAILED DESCRIPTION OF PREFERRED EMBODIMENTS

Figure 1:
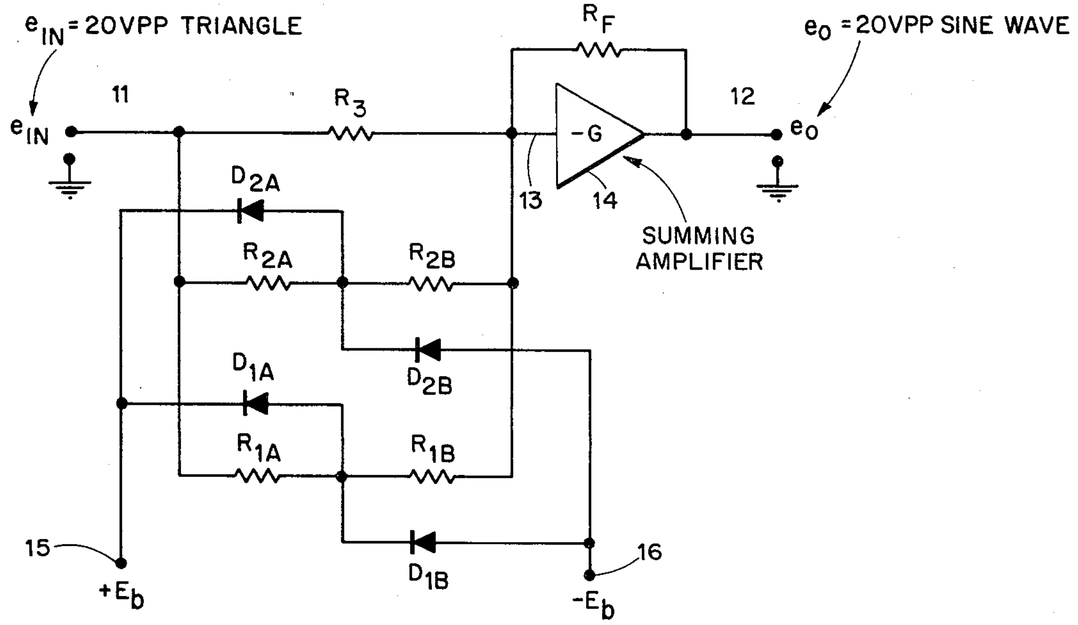
FIG. 1 is a primarily schematic circuit diagram of an exemplary embodiment of the invention for converting a triangular waveform into a sine wave.

With reference now to the drawing and more particularly FIG. 1 thereof, there is shown a primarily schematic circuit diagram of an exemplary embodiment of the invention responsive to a 20-volt peak-peak triangular waveform on input terminal 11 for providing a 20-volt peak-peak sine wave at output terminal 12. The circuit of FIG. 1 embodies an approximation involving three piecewise linear segments represented in FIG. 2. These segments are numbered 1, 2 and 3 and embrace the intervals from 0°–50°, 50°–70° and 70°–90°, respectively. The four breakpoints are designated by $n$=0 at 0°, $n$=1 at 50°, $n$=2 at 70° and $n$=3 at 90°. So as not to obscure the principles of the invention, this three-segment circuit is shown; however, it will be apparent to those skilled in the art that more or less segments may be selected to approximate a given functional relationship within the principles of the invention. A circuit according to the invention has more diodes conduct as the potential magnitude of the input increases thereby clamping the signal path through each pair of resistors to $+E_b$ or $-E_b$, reducing the effective gain with increasing magnitude. The gain A from terminal 11 to 12 is essentially the ratio of the unclamped parallel resistance between input terminal 11 and the input 13 of summing amplifier 14 ($R_{in\ equivalent}$) and feedback resistance $R_f$. $A=R_f/R_{in\ equivalent}$. Terminals 15 and 16 receive fixed potentials of $+E_b$ and $-E_b$, respectively. Resistor R3 is the largest of the parallel combination, followed by resistors R2A, R2B, R1A, and R1B. In computing the parallel combination R2A and R2B are treated as one resistor R2 of value (R2=R2A+R2B). This also applies to R1A and R1B.

The circuitry is basically an operational amplifier with $R_f$ the feedback resistance and the effective resistance between terminal 11 and input 13 the input resistance. With all the diodes nonconducting, the effective input resistance is the parallel combination of resistances R1, R2, and R3. However, when an associated diode conducts clamping a pair of resistors to $+E_b$ or $-E_b$, the effective resistance increases between terminals 11 and 13, thereby reducing the gain from terminal 11 to terminal 12. When the potential on terminal 11 is zero, none of the diodes conduct. As it becomes positive and exceeds the potential $E_b$ by a predetermined value, first diode D1A, conducts to clamp the junction of resistors R1A and R1B to the potential $+E_b$. Then with further increase in input diode D2A conducts to clamp the junction between resistors R2A and R2B at the potential $E_b$. Thus, the first segment in FIG. 2 corresponds to no diodes conducting, the second corresponds to only D1A conducting and the third corresponds to diode D2A also conducting. In the next time quadrant a fourth segment corresponds to diodes D1A and D2A both conducting, a fifth segment to only diode D1A conducting and a sixth segment to no diodes conducting. In a similar manner for the negative half cycle, diodes D1B and D2B close and open to complete the cycle in which six more segments approximate the negative half of a sine wave cycle.

Having briefly discussed the physical aspects of the operation, it is now appropriate to consider the procedure for choosing the correct parameter values. Consider first the following definition of terms:

| | |
|---|---|
| s | Steps |
| n | Break points |
| θn | Angle of break point n |
| $ein_n$ | Input voltage at break point |
| $\Delta ein_s$ | Input voltage change from one break point to the next |
| $e_{on}$ | Output voltage at break point |
| $e_{on}'$ | Normalized output voltage (scale factor removed) |
| K | Scale factor K=Peak Output Amplitude/10 |
| $\Delta e_{os}'$ | Change in output voltage from one break point to the next |
| γs | Gamma the factor by which the length of a step is larger or smaller than the following step |
| $\Delta e_m'$ | Following step's contribution to the change in ($\Delta e_{os}'$) |
| $\Delta e_s'$ | Contribution to $\Delta e_{os}'$ of the step under consideration |
| Rs | Input resistor for that step |
| *NOTE: | The prime sign indicates that the scale factor is removed |

The following general equations apply:

$e_{on} = 10K \sin \theta_n$; Therefore, $e'_{on} = e_{on/K} = 10 \sin \theta_n$ For the triangle from 0° to 90° and 10 v. peak $de_{in}'d\theta = 1/9$; Therefore $ein_n = (1/9)\ \theta_n$ $K$ = Peak Output Amplitude/10 1 For this example.

Figure 2:
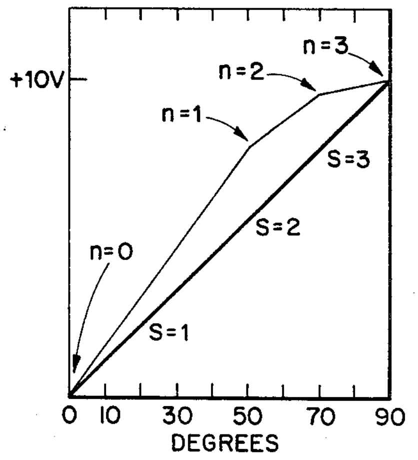
FIG. 2 is a graphical representation of the functional relationship between triangular and sine waveforms for the first quarter cycle.

For this example a convenient value of the feedback resistance $R_f$ is $2K$. In the specific example the output voltage $e_o$ is 20 v. p—p and symmetrical for the positive and negative portions of the input triangular waveform and for the negative slope of the input. Therefore, the points designated $n = 0$ and 3 in FIG. 2 are not really break points. At the point $n = 0$ the slope remains the same in the transition between positive and negative regions. At the point $n = 3$ the transition from a positive to a negative slope occurs. Not being a true sine wave, the slope would not go to zero.

The slope of the output voltage $e_o$ from −50° to 0° is the same as from 0° to +50°. The slope from 90° to 110° is the same as from 70° to 90°, except with a negative value. Since summing amplifier 14 inverts, the output sine wave on the terminal 12 is inverted relative to the polarity of the input triangular waveform on terminal 11. Because of the symmetry, the analysis with respect to FIG. 2 is as if triangular and sinusoidal waveforms are in phase.

It is appropriate now to determine the values of resistors R1A, R1B, R2A and R2B, which set the break points to occur at the proper input voltage.

Figure 3:
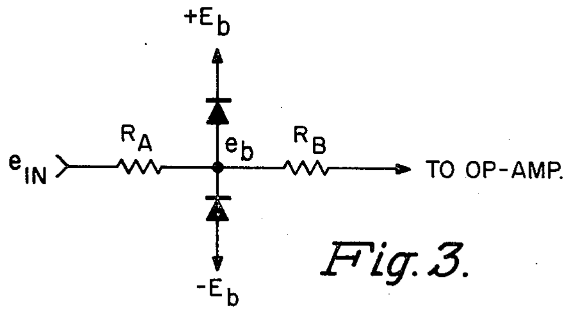
FIG. 3 is a schematic circuit diagram of a typical section having a pair of resistors and pair of diodes.

Referring to FIG. 3, there is a simplified schematic circuit diagram helpful in understanding these computations.

$R_S = R_A + R_B$ $e_b = ein_n\ (R_B/R_A + R_B)$ $R_B = R_S\ (e_b/ein_n)$ $R_A = R_S - R_B$ $R_A = R_S - R_S(e_b/ein_n)$ $R_A = R_S\ [1 - (e_b/ein_n)]$ Applying these equations, the following table may be constructed:

| s | n | θ, deg. | $ein_n$ | $e_b$ | $\frac{e_b}{ein_n}$ | $1-\frac{e_b}{ein_n}$ | Rs | $R_A$ | $R_B$ |
|---|---|---|---|---|---|---|---|---|---|
| | 0 | 0 | 0 | | | Not a break point | | | |
| 1 | | | | | | | 3.348K | 2.745K | .6026K |
| | 1 | 50 | 5.555 . . | 1V | .1800 | .8200 | | | |
| 2 | | | | | | | 3.918K | 3.414K | .5034K |
| | 2 | 70 | 7.777 . . | 1V | .1285 | .8715 | | | |
| 3 | | | | | | | 7.360K | | |
| | 3 | 90 | 10 | | | Not a break point | | | |

$\Delta ein_s = ein_n - e_{in]n-1)}$; $\Delta e_{os}' = e'_{on} - e_o'_{]n-1)}$ $\gamma s = \theta_n - \theta_{]n-1)}/\theta_{]n+1)} - \theta_n$; $\Delta e'_m = \gamma s \Delta e'_{o]s+1)}$ $\Delta e'_s = \Delta e'_{os} - \Delta e'_m$ where $\Delta e'_{o]s+1)}$ is the following step change and $\Delta e'_{os}$ is the change of the step under consideration.

$A_s = \Delta e'_s K/\Delta ein_s = R_f/R_s$; Therefore $R_s = R_f/k(\Delta ein_s/\Delta e'_s)$ where $A_s$ = Gain to the output for the contribution of the step under consideration From these equations the following relations may be established for the indicated valves of the four break-points and three segments.:

For the example $R_f = 2K$ $E_b = e_b - 0.6V = 1v - 0.6V = 0.4V$ $E_b$ equals the difference between $e_b$ and the forward drop across a conducting diode, typically 0.6 volts for a type 1N 4149 diode, $E_b$ equals 0.4 volts.

Figure 4:
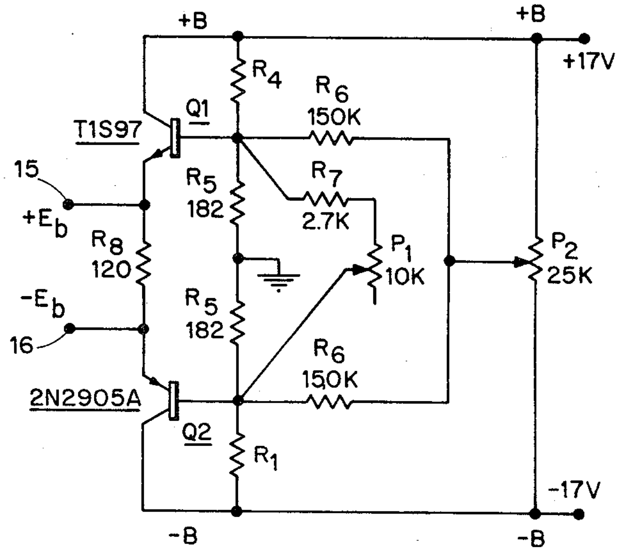
FIG. 4 is a schematic circuit diagram of a preferred potential source.

Referring to FIG. 4, there is shown a schematic circuit diagram of a preferred circuit for providing the source potentials $E_b$ and $-E_b$ which provides approximate temperature compensation of the diodes. Transistors Q1 and Q2 function as emitter followers. Typical parameter values are set forth in FIG. 4. Balancing potentiometers P1 and P2 are adjusted to minimize sine wave distortion. In an actual working embodiment of the invention having fixed break points for each half cycle at 15°, 40°, 60°, 75° and 85°, the commercially

| n | s | $\theta_n$, deg. | $ein_n$ | $\Delta ein_s$ | $e'_{on}$ | $\Delta e'_{os}$ | γs | $\Delta e'_m$ | $\Delta e_s$ | $\frac{\Delta ein_s}{\Delta e'_s}$ | Rs |
|---|---|---|---|---|---|---|---|---|---|---|---|
| 3 | | 90 | 10 | | 10 | | | | | | |
| | 3 | | | 2.222 . . | | 0.603 | | | 0.603 | 3.685 | 7.360K |
| 2 | | 70 | 7.777 . . . | | 9.397 | | | | | | |
| | 2 | | | 2.222 . . | | 1.737 | 1 | 0.603 | 1.134 | 1.959 | 3.918K |
| 1 | | 50 | 5.555 . . . | | 7.660 | | | | | | |
| | 1 | | | 5.555 . . | | 7.660 | 2.5 | 4.342 | 3.318 | 1.674 | 3.348K |
| 0 | | 0 | 0 | | 0 | | | | | | |

available Krohn-Hite 5,400 and 5,100 function generators meet specifications of sine wave distortion less than 0.5° over the temperature range of 0° C to 50° C over the frequency range from 0.002 Hz to 100 KHz.

An alternate set of parameter values for the circuit of FIG. 4 is as follows:

| | |
|---|---|
| Transistor Q1 | TIS 92 |
| Transistor Q2 | 2N2905A |
| Resistor R1 | 2K |
| Resistor R4 | 2K |
| Resistors R5 | 200 |
| Resistors R6 | 75K |
| Resistor R7 | 1K |
| Resistor R8 | 120 |
| Potentiometer P1 | 5K |
| Potentiometer P2 | 25K |

The principles of the invention may be used to provide output waveforms of increasing slope as a function of input signal amplitude by connecting the resistor-diode network across the feedback resistance $R_F$ instead of across resistance R3. Furthermore, by having such networks as comprising both the input resistance and the feedback resistance, virtually any relationship between input signal amplitude and output signal amplitude may be established.

There has been described novel function generating apparatus capable of remarkable electrical performance with little adjustment over wide temperature and frequency ranges. It is evident that those skilled in the art may now make numerous other uses and modifications of and departures from the specific embodiments described herein without departing from the inventive concepts. Consequently, the invention is to be construed as embracing each and every novel feature and novel combination of features present in or possessed by the apparatus and techniques herein disclosed.

What is claimed is:

1. Function generating apparatus comprising
an input terminal,
an output terminal,
means including a summing amplifier and a variable resistance intercoupling said input terminal and said output terminal for establishing the gain between said input and output terminal as a function of said variable resistance,
said summing amplifier having an input and an output intercoupled by a feedback resistance,
said variable resistance comprising,
a source of a first fixed potential,
a plurality of first resistive means,
and a corresponding plurality of first unilaterally conducting devices coupling respective ones of said first resistive means to said source of a first fixed potential and comprising means for clamping the associated resistive means to said first fixed potential within associated amplitude ranges of a signal on said input terminal of a first polarity,
said variable resistance intercoupling said input terminal and said summing amplifier input to provide a current to the latter input related to the ratio of said first fixed potential to the value of said variable resistance.

2. Function generating apparatus in accordance with claim 1 wherein said variable resistance further comprises,
a source of a second fixed potential,
a plurality of second resistive means,
and a corresponding plurality of second unilaterally conducting devices coupling respective ones of said second resistive means to said source of a second fixed potential for clamping the associated resistive means to said second fixed potential within associated amplitude ranges of a signal on said input terminal of second polarity opposite said first polarity,
said variable resistance providing a current to said summing amplifier input related to the ratio of said first fixed potential to the value of said variable resistance when the potential on said input terminal is of one of the two polarities and related to the ratio of said second fixed potential to the value of said variable resistance when the potential on said input terminal is of the other of the two polarities.

3. Function generating apparatus in accordance with claim 2 wherein said first and second fixed potentials are of said first and second polarities respectively,
each first resistive means is in series with a respective second resistive means,
and each of said unilaterally conducting devices is connected between the junction of an associated pair of first and second resistive means in series and an associated one of said potential sources,
said first and second unilaterally conducting devices being oppositely poled.

4. Function generating apparatus in accordance with claim 3 wherein said sources of fixed potentials comprise a pair of emitter followers providing substantially the same potential magnitudes but of opposite polarity.

5. Function generating apparatus in accordance with claim 4 wherein a first resistance of a pair $R_A$, a second resistance of a pair $R_B$, the potential $e_b$ at the junction when a unilaterally conducting device connected thereto just conducts in response to the input potential on said input terminal then being an associated breakpoint potential $ein_n$ are related by the equations:
$R_S = R_A + R_B$,
$R_A = R_S(1 - e_b/ein_n)$,
$R_B = R_S e_b/ein_n$.

6. Function generating apparatus in accordance with claim 5 wherein said pairs of resistances are connected in parallel.

* * * * *